United States Patent
Masuda

(10) Patent No.: US 10,913,565 B2
(45) Date of Patent: Feb. 9, 2021

(54) AIRCRAFT WATER TANK AND MANUFACTURING METHOD THEREFOR

(71) Applicant: The Yokohama Rubber Co., LTD., Tokyo (JP)

(72) Inventor: Mitsutaka Masuda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 899 days.

(21) Appl. No.: 15/031,920

(22) PCT Filed: Oct. 21, 2014

(86) PCT No.: PCT/JP2014/077967
§ 371 (c)(1),
(2) Date: Apr. 25, 2016

(87) PCT Pub. No.: WO2015/060308
PCT Pub. Date: Apr. 30, 2015

(65) Prior Publication Data
US 2016/0264284 A1    Sep. 15, 2016

(30) Foreign Application Priority Data
Oct. 25, 2013 (JP) .................. 2013-221976

(51) Int. Cl.
*B29C 49/00* (2006.01)
*B65D 1/48* (2006.01)
(Continued)

(52) U.S. Cl.
CPC .......... *B65D 1/48* (2013.01); *B29C 49/0005* (2013.01); *B29C 53/602* (2013.01); *B29C 65/48* (2013.01);
(Continued)

(58) Field of Classification Search
CPC .......... B65D 1/42; B65D 1/48; B29D 22/003; B29C 53/56–78
See application file for complete search history.

(56) References Cited

U.S. PATENT DOCUMENTS 4,785,956 A * 11/1988 Kepler .................. B29C 53/605
                                                    138/30
5,568,878 A    10/1996 LeBreton
2008/0264560 A1* 10/2008 Oosaki .................. B29C 65/02
                                                    156/304.2

FOREIGN PATENT DOCUMENTS

EP     2 112 423       10/2009
JP     2009-121652      6/2009
(Continued)

OTHER PUBLICATIONS

Materials Today, Thermosetting resins—an introduction (2012), Materials Today (Year: 2012).*
(Continued)

Primary Examiner — Matthew J Daniels
Assistant Examiner — Andrew L Swanson
(74) Attorney, Agent, or Firm — Thorpe North & Western

(57) ABSTRACT

The present technology provides a method for manufacturing an aircraft water tank provided with a hollow body and a fiber-reinforced resin layer covering the hollow body. A blow molding step is performed in which polyolefin resin, a thermoplastic resin exhibiting superior durability against disinfectants, is blow molded to obtain a hollow body. Next, a surface treatment step is performed in which a surface treatment is performed upon the entire surface of the hollow body, thereby improving the adhesiveness of the entire surface. Next, a filament winding step is performed in which reinforcing fibers impregnated with a thermosetting resin are wound around the surface of the hollow body and the outer surfaces of the flanges and heated in order to cure the
(Continued)

thermosetting resin, thereby forming the fiber-reinforced resin layer on the surface of the hollow body and the outer surface of the flanges.

1 Claim, 1 Drawing Sheet

(51) Int. Cl.
*B29C 53/60* (2006.01)
*B29C 70/16* (2006.01)
*B29C 65/48* (2006.01)
*B29C 65/70* (2006.01)
*B29C 70/06* (2006.01)
*B64D 11/00* (2006.01)
*B29L 31/00* (2006.01)
*B29L 31/30* (2006.01)
*B64D 11/02* (2006.01)
*B29K 23/00* (2006.01)

(52) U.S. Cl.
CPC .............. *B29C 65/70* (2013.01); *B29C 70/06* (2013.01); *B29C 70/16* (2013.01); *B64D 11/00* (2013.01); *B29K 2023/06* (2013.01); *B29K 2023/12* (2013.01); *B29L 2031/3076* (2013.01); *B29L 2031/712* (2013.01); *B64D 11/02* (2013.01); *Y02T 50/40* (2013.01)

(56) References Cited

FOREIGN PATENT DOCUMENTS

| JP | 2011-245796 | 12/2011 | | |
|---|---|---|---|---|
| JP | 2011-251736 | 12/2011 | | |
| JP | 2013-002493 | 1/2013 | | |
| JP | 2013-209110 | 10/2013 | | |
| WO | WO-9535339 A1 | * 12/1995 | ......... | B29C 37/0078 |
| WO | WO 2013/018237 | 2/2013 | | |
| WO | WO-2013018237 A1 | * 2/2013 | ............ | B29C 70/32 |

OTHER PUBLICATIONS

Pethrick, 9-Composite to metal bonding in aerospace and other applications, Woodhead Publishing, 2012 (accessed Apr. 9, 2020), (http://www.sciencedirect.com/science/article/pii/B9781845695323500095) (Year: 2012).*
International Search Report for International Application No. PCT/JP2014/077967 dated Jan. 27, 2015, 4 pages, Japan.

* cited by examiner

AIRCRAFT WATER TANK AND MANUFACTURING METHOD THEREFOR

TECHNICAL FIELD

The present technology relates to an aircraft water tank and a method for manufacturing the same.

BACKGROUND ART

An aircraft water tank provided with a hollow body made of synthetic resin and a fiber-reinforced resin layer covering the surface of the hollow body is known in the art (see Japanese Unexamined Patent Application Publication No. 2011-245796A).

It is essential that an aircraft water tank be durable against various disinfectants used to disinfect the aircraft water tank.

For this reason, ABS (Acrylonitrile Butadiene Styrene) resin is used as a synthetic resin forming the hollow bodies of aircraft water tanks, the hollow bodies being obtained via blow molding. The fiber-reinforced resin layer is formed by winding reinforcing fibers impregnated with a thermosetting resin around the surface of the hollow body and curing the thermosetting resin.

However, because ABS resin has the property of abruptly softening beyond a certain temperature, the temperature of the ABS resin must be kept within a very narrow range during blow molding, with the result that the work of blow molding ABS resin is difficult and requires a high level of skill, which is disadvantageous for improving work efficiency and production efficiency.

In addition, ABS resin has a softening temperature near 45° C., with the result that the curing temperature used when curing the thermosetting resin cannot be 90° C. or higher at most and curing time cannot be reduced, which is disadvantageous for improving production efficiency.

SUMMARY

The present technology provides an aircraft water tank and a method for manufacturing the same that are advantageous for improving the durability of the aircraft water tank against disinfectants, ensuring the structural durability of the aircraft water tank, and improving production efficiency and reducing the costs of the aircraft water tank.

The present technology provides a method for manufacturing an aircraft water tank provided with a hollow body and a fiber-reinforced resin layer covering the hollow body, the method including a blow molding step of blow molding a polyolefin resin to obtain the hollow body, a surface treatment step of surface-treating the entirety of the surface of the hollow body to improve adhesiveness across the entire surface of the hollow body, and a filament winding step of winding reinforcing fibers impregnated with a thermosetting resin around the surface of the hollow body following the surface treatment step and heating the fibers to cure the thermosetting resin and form the fiber-reinforced resin layer on the surface of the hollow body.

The present technology also provides an aircraft water tank provided with a hollow body and a fiber-reinforced resin layer covering the hollow body, the hollow body being formed from a polyolefin resin, an adhesiveness-improving surface treatment being performed upon the entirety of a surface of the hollow body, and the fiber-reinforced resin layer being formed by winding reinforcing fibers impregnated with a thermosetting resin around the surface of the hollow body.

In accordance with the present technology, an interior surface of a hollow body of an aircraft water tank is formed from a polyolefin resin, which is advantageous in improving the durability of the aircraft water tank against disinfectants.

In addition, because a surface treatment is performed upon the entire surface of the surface of the hollow body, the hollow body and the fiber-reinforced resin layer can be securely bonded, which is advantageous in ensuring the structural durability of the aircraft water tank.

Moreover, the polyolefin resin does not abruptly soften beyond a certain temperature as conventional ABS resin does, but gradually softens as temperature increases. Thus, it is sufficient for the temperature of the polyolefin resin to be kept within a comparatively broad range during blow molding, thereby facilitating the work of blow molding, which is advantageous for improving production efficiency.

In addition, because polyolefin resin does not soften around 90° C., the curing temperature used when curing the thermosetting resin can be set to about 120° C., which is advantageous for reducing the curing time of the thermosetting resin and improving production efficiency.

DETAILED DESCRIPTION

Next, embodiments of the present technology will be described with reference to the drawings.

First, the configuration of an aircraft water tank manufactured according to a manufacturing method of an embodiment of the present embodiment will be described.

Figure 1:
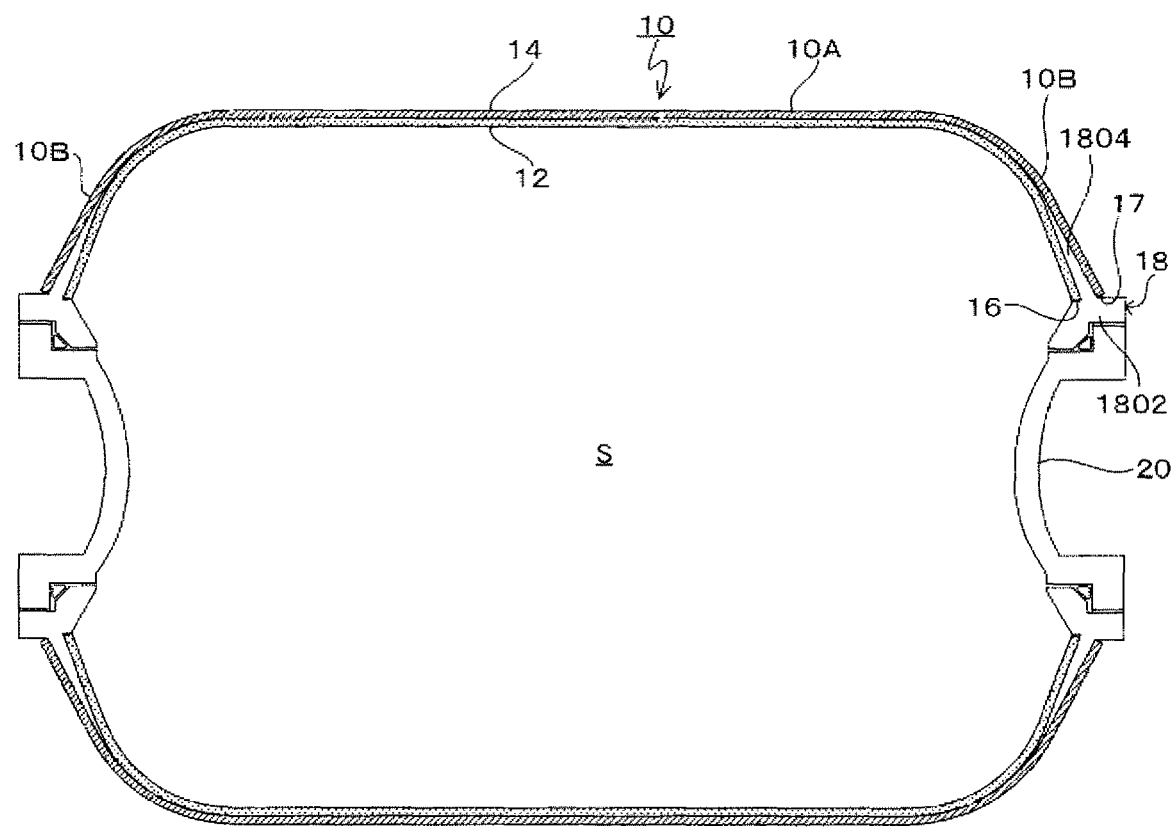
FIG. 1 is a cross-sectional view of an aircraft water tank manufactured according to a manufacturing method of an embodiment of the present technology.

As illustrated in FIG. 1, an aircraft water tank 10 is a tank for storing drinking water, and comprises a cylindrical body section 10A, dome sections 10B on both ends of the body section 10A, and mouthpieces 18 provided in the centers of the dome sections 10B.

The body section 10A and the dome sections 10B include a hollow body 12 and a fiber-reinforced resin layer 14.

Figure 2:
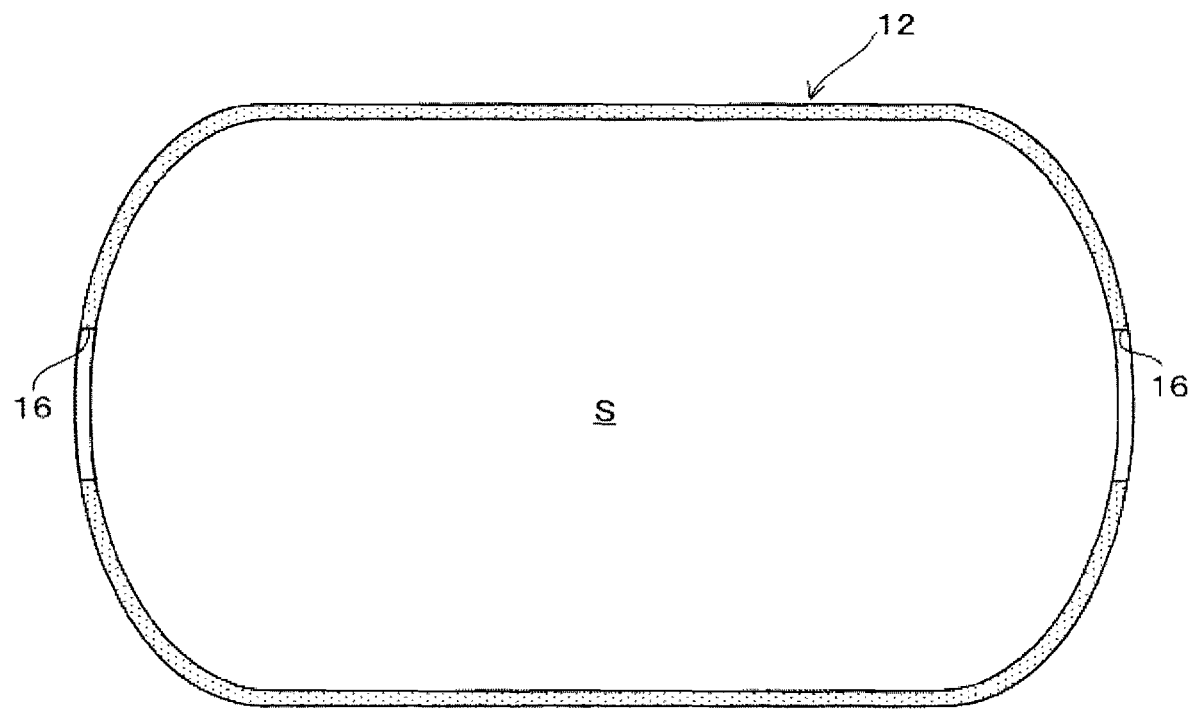
FIG. 2 is a cross-sectional view of a hollow body 12 obtained via a blow molding step.

As illustrated in FIG. 2, the hollow body 12 is what is referred to as a liner, and forms an internal space S for storing drinking water, and is provided with openings 16 on both ends in the axial direction.

The hollow body 12 is formed from polyolefin resin, and an adhesiveness-improving surface treatment is performed on the entire surface of the hollow body 12 (i.e., the outer surface of the hollow body 12).

The fiber-reinforced resin layer 14 is formed by winding reinforcing fibers (filaments) impregnated with a thermosetting resin around the surface of the hollow body 12.

Openings 17 are provided coaxially with the openings 16 on both axial ends of the fiber-reinforced resin layer 14.

The mouthpieces 18 are provided so as to bridge the area between the openings 16 in the hollow body 12 and the openings 17 in the fiber-reinforced resin layer 14, and caps 20 are removably attached to the mouthpieces 18.

The mouthpieces 18 comprise cylindrical mouthpiece bodies 1802 and flat, ring-shaped flanges 1804 provided on the outer circumferences of the mouthpiece bodies 1802.

With the mouthpiece bodies 1802 of the mouthpieces 18 positioned inside the openings 16, 17, the inner faces of the flanges 1804 are bonded to the portions of the hollow body 12 around the openings 16 using an adhesive, and the outer faces of the flanges 1804 are bonded to the portions of the fiber-reinforced resin layer 14 around the openings 17.

Next, a method for manufacturing the aircraft water tank 10 will be described.

First, a blow molding step is performed in which a thermoplastic resin constituted by a polyolefin resin is blow molded to obtain a hollow body 12 provided with a cylindrical body section and dome sections comprising openings 16 on both ends of the body section.

The blow molding involves melting a synthetic resin into a pipe-like shape, inserting the pipe into a mold, and pumping air into the interior of the pipe to obtain a molded product.

Various known synthetic resins such as polypropylene and polyethylene can be used as the polyolefin resin.

Polypropylene is characterized in ordinarily having a good heat resistance temperature of 100 to 140° C., and a specific gravity that is the lightest among synthetic resins at 0.9 to 0.91, and being inexpensive. It also possesses superior mechanical properties in terms of tensile strength, compressive strength, and impact strength, has a high level of surface hardness, and has superior wear resistance. It is also highly resistant to the acidity and alkalinity of disinfectants.

Polyethylene, apart from having a heat resistance temperature that is slightly inferior to that of polypropylene at 90 to 110° C., possesses properties comparable to those of polypropylene, and is highly resistant to the acidity and alkalinity of disinfectants.

Next, a surface treatment step is performed in which a surface treatment is performed upon the entire surface of the hollow body 12, thereby improving the adhesiveness of the entire surface.

Specifically, because polyolefin resin exhibits poor adhesiveness, a surface treatment is performed on the surface of the hollow body 12 in order to modify the surface and improve adhesiveness.

Examples of the surface treatment include corona discharge treatment, plasma treatment, and ITRO treatment.

Corona discharge treatment and plasma discharge roughens and oxidizes a surface by generating a corona discharge or a plasma discharge on the surface, thereby activating the surface.

ITRO treatment involves introducing a silane compound into a fuel gas in order to form a flame and using the flame to treat the surface, thereby forming a nano-level silicon oxide film and improving bond strength between the surface and the adhesive.

The surface treatment is not limited to corona discharge treatment, plasma treatment, and ITRO treatment; various conventionally known surface treatments may be used as long as they improve the adhesiveness of the entire surface.

Next, the mouthpieces 18 are mounted by being bonded using adhesive to the openings 16 in the hollow body 12.

The mouthpieces 18 are mounted on the openings 16 by the inner faces of the flanges 1804 being bonded using an adhesive to those parts of the hollow body 12 around the openings 16.

Next, a filament winding step is performed in which reinforcing fibers impregnated with a thermosetting resin are wound around the surface of the hollow body 12 and the outer surfaces of the flanges 1804 and heated in order to cure the thermosetting resin, thereby forming the fiber-reinforced resin layer 14 on the surface of the hollow body 12 and the outer surface of the flanges 1804.

More specifically, the reinforcing fibers impregnated with thermosetting resin are wound from the flanges 1804 over the surface of the hollow body 12, after which the thermosetting resin is thermally cured to form the fiber-reinforced resin layer 14. The flanges 1804 are thus mounted to both the hollow body 12 and the fiber-reinforced resin layer 14.

Various conventionally known thermosetting resins such as epoxy resin can be used as the thermosetting resin.

Various conventionally known fibers such as glass fibers and carbon fibers can be used as the reinforcing fibers.

After the filament winding step is finished, the caps 20 are attached to the mouthpieces 18.

Through the steps described above, an aircraft water tank 10 provided with a hollow body 12 that is made of polyolefin resin and the entire surface of the hollow body 12 which has been subjected to an adhesiveness-improving surface treatment and a fiber-reinforced resin layer 14 formed by winding reinforcing fibers impregnated with a thermosetting resin is obtained.

In accordance with the present embodiment, the inner surface of the hollow body 12 of the aircraft water tank 10 is formed from a polyolefin resin, thereby improving the durability of the inner surface of the hollow body 12 against the acidity and alkalinity of disinfectants, which is advantageous in improving the durability of the aircraft water tank 10 against disinfectants.

In addition, because a surface treatment is performed upon the entire surface of the surface of the hollow body 12, the hollow body 12 and the fiber-reinforced resin layer 14 can be securely bonded despite polyolefin resin being used to form the hollow body 12, which is advantageous in ensuring the structural durability of the aircraft water tank 10.

The present embodiment is advantageous in improving the production efficiency of the aircraft water tank 10 in the following ways.

Specifically, conventional aircraft water tanks present the following drawbacks due to the hollow body 12 being obtained by blow molding ABS resin.

ABS resin abruptly softens when the temperature exceeds about 140° C. during blow molding, and becomes so soft that blow molding is impeded. ABS resin also becomes too hard when the temperature reaches about 130° C. or less during blow molding, also impeding blow molding.

Therefore, the temperature of the ABS resin must be kept within a very narrow range during blow molding, with the result that the work of blow molding ABS resin is difficult and requires a high level of skill.

By contrast, the polyolefin resin used for the hollow body 12 of the aircraft water tank 10 according to the present embodiment does not abruptly soften beyond a certain temperature as conventional ABS resin does, but gradually softens as temperature increases.

Thus, it is sufficient for the temperature of the polyolefin resin to be kept within a comparatively broad range during blow molding, which is advantageous for facilitating the work of blow molding and improving production efficiency.

Note that the glass transition point (glass transition temperature) of ABS resin is from 80 to 125° C., the glass transition point of the polyolefin resin polyethylene is $-125°$ C., and the glass transition point of the polyolefin resin polypropylene is 0° C.

In addition, ABS resin has a softening temperature near 45° C., with the result that the curing temperature used when curing the thermosetting resin in the filament winding step cannot be 90° C. or higher at most, which is disadvantageous for reducing curing time.

By contrast, the polyolefin resin used for the hollow body 12 of the present embodiment, to take polypropylene as an example, has an ordinary heat resistance temperature of 100 to 140° C. and thus does not soften at 90° C., allowing the curing temperature to be set around 120° C. The same can also be said for polyolefin resins other than polypropylene.

Accordingly, the present embodiment is advantageous in reducing curing time when curing the thermosetting resin, and in improving production efficiency.

Therefore, the present embodiment is advantageous for improving the durability of the aircraft water tank 10 against disinfectants, ensuring the structural durability of the aircraft water tank 10, and improving production efficiency and reducing the costs of the aircraft water tank 10.

The invention claimed is:

1. A method for manufacturing an aircraft water tank provided with a hollow body and a fiber-reinforced resin layer covering the hollow body, wherein there are provided mouthpieces comprising cylindrical mouthpiece bodies and flat, ring-shaped flanges provided on outer circumferences of the mouthpiece bodies, and the hollow body is provided with a cylindrical body section and dome sections that are provided on both ends of the body section and comprise openings, the method comprising:
   a blow molding step of blow molding a polyolefin resin to obtain the hollow body;
   a surface treatment step of surface-treating the entirety of a surface of the hollow body to improve adhesiveness across the entirety of the surface;
   a filament winding step of winding reinforcing fibers impregnated with a thermosetting resin around the surface of the hollow body following the surface treatment step and heating the fibers to cure the thermosetting resin and form the fiber-reinforced resin layer on the surface of the hollow body, and
   an attachment step in which the mouthpiece bodies are positioned inside the openings, and inner faces of the flanges facing outer faces of the dome sections are bonded using an adhesive to parts of outer surfaces of the dome sections around the openings, thereby attaching the mouthpieces to the hollow bodies, the attachment step being performed prior to the filament winding step, wherein
   the surface treatment step is performed by an ITRO treatment comprising the steps of introducing a silane compound into fuel gas in order to form flame and treating the surface of the hollow body using the flame thereby to form a nano-level silicon oxide film on the surface,
   in the filament winding step, the reinforcing fibers impregnated with the thermosetting resin are placed upon the surface of the hollow body and wound around outer faces of the flanges on sides opposite the inner faces, and
   in the filament winding step, the reinforcing fibers impregnated with the thermosetting resin are placed upon the surface of the hollow body and wound around outer faces of the flanges on sides opposite the inner faces without extending the winding beyond the flanges to the cylindrical mouthpiece bodies.

* * * * *